3,180,287
EJECTOR CONSTRUCTION FOR WAFERING MACHINES
Vernon J. Lundell, Cherokee, Iowa, assignor to Massey-Ferguson Services N.V., Netherlands Antilles, a corporation of Netherlands Antilles
Filed Apr. 1, 1963, Ser. No. 269,562
2 Claims. (Cl. 107—14)

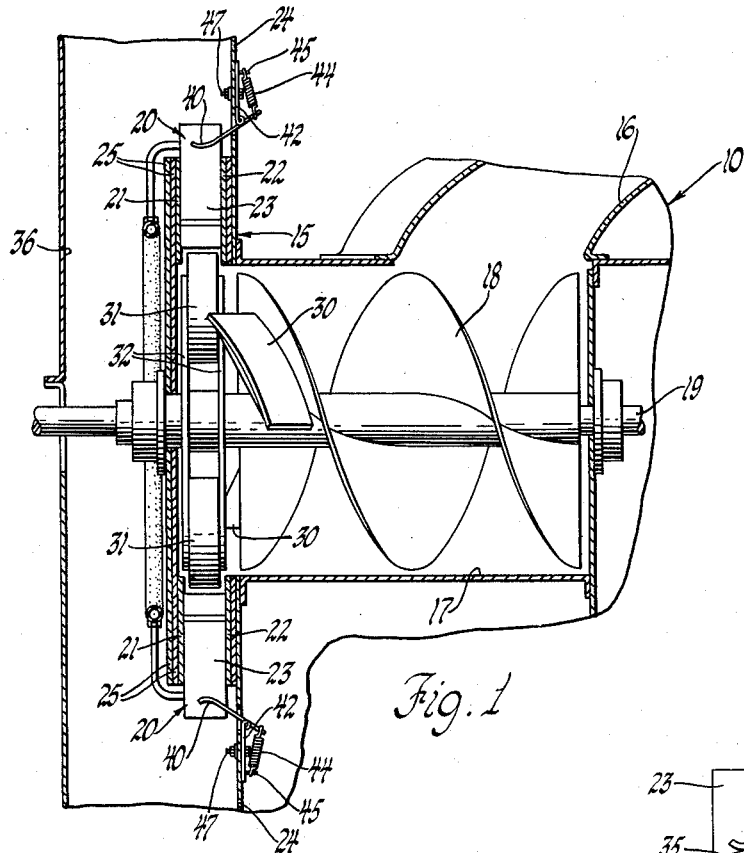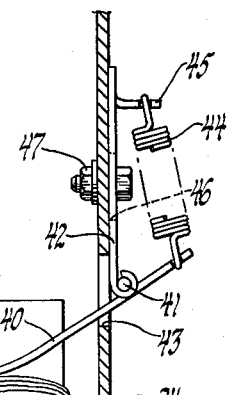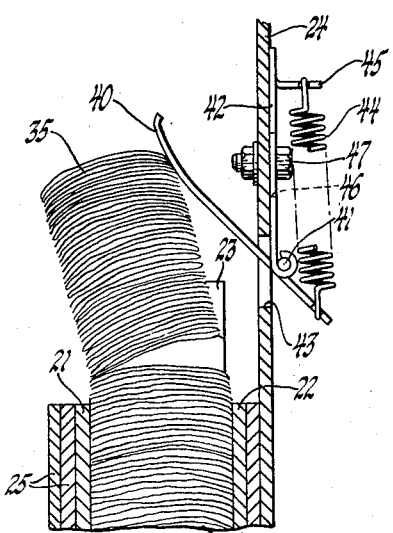

This invention relates generally to agricultural wafer forming machines and more particularly concerns an ejector construction for such machines.

Forage crops such as hay have traditionally been gathered into bales for convenience in handling and storage. Recently, however, practical wafering machines have come into use which form forage crop material into compacted wafers or pellets, a system having substantial advantages over the traditional baling technique. An efficient type of wafering machine is disclosed in my co-pending application, Serial No. 153,599, filed November 20, 1961, in which finely divided crop material is forced through die cells in a kind of extrusion process. The compacted extruded crop material is broken off into discrete segments which define the wafers.

The present invention lies in a very simple, essentially one-piece, ejector mechanism for wafering machines of the above type wihch provides reliable cam action break off of the extruded crop material into wafers while holding the material firmly until separation and then exerting a positive wafer ejecting force.

An example of the inventive ejector mechanism is shown in the accompanying drawings, in which:

FIGURE 1 is a fragmentary section of that portion of a wafering machine which includes the wafering mechanism and in which the present invention is embodied; and FIGS. 2 and 3 are enlarged fragmentary sections showing alternate operating positions of the ejector mechanism appearing in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown a fragment of a wafering machine 10 embodying a wafering mechanism 15. The machine 10 includes a hood 16 through which particulated crop material is delivered to a hopper 17. An auger conveyor 18 mounted on a main shaft 19 feeds material through the hopper 17 toward the wafering mechanism 15. The mechanism 15 comprises an annular array of outwardly opening die cells 20 defined by annular side plates 21 and 22 having interposed, generally radially oriented partitions 23. The side plates 21, 22 and the intermediate partitions 23 are sandwiched between a frame wall 24 and a pair of circular wall plates 25.

The crop material moved toward the wafering mechanism 15 by the conveyor 18 is delivered radially outward toward the die cells 20 by vanes 30, of which only one is shown, mounted on the conveyor 18. The finely divided crop material is then forced into and extruded through the die cells 20 by press rolls 31 which are journalled on arms 32 that are mounted on the shaft 19. As more and more crop material is packed into the die cells 20 by the rollers 31, compacted crop material 35 (see FIG. 3) is extruded from the die openings.

Pursuant to the invention, the extruded crop material from each die cell is separated into discrete wafers and ejected into a chamber 36 by devices which include biased blades 40 pivoted on the frame wall 24 so as to extend out and over each of the die cells; there being one blade for each die cell. Since the construction and arrangement of each of the blades is identical, they will be described in the singular.

Preferably, the blade 40 is pivoted on a shaft 41 mounted on a plate 42 that is bolted to the frame wall 24 on the side opposite the die cells 20. The blade 40 extends through an opening 43 formed in the frame wall 24 so as to overlie the compacted crop material 35 being extruded from the die cell. The blade 40 is biased by a tensioned spring 44 that is stretched between the end of the blade and a tab 45 formed on the plate 42.

In the preferred construction, the plate 42 is slotted at 46 so that a bolt 47, which secures the plate to the frame wall 24, can be loosened and the position of the frame plate adjusted relative to the open end of the die cell 20.

In operation, the blade 40 is initially positioned over the open end of the die cell 20 by the then relaxed spring 44. As the compacted material 35 is extruded from the die cell, the blade is tilted against the force exerted by the spring 44 so that the blade exerts a firm supporting force on the extruded material. As the mass of extruded crop material 35 moves past the blade pivot shaft 41, the blade begins to define a camming surface which eventually, as shown in FIG. 3, deflects and breaks off a segment of the crop material into a discrete wafer or pellet. The separated wafers are then positively urged laterally by the biased blade 40 into the chamber 36 and the blade swings, under the force of the spring 44, to again cover the opening of the die cell whereupon the operation is repeated.

The embodiments of the invention in which an exclusive property or privilege is claimed are defined as follows:

1. An ejector device for wafering machines having at least one die cell from which compacted crop material is extruded in an axially outward direction adjacent a frame, characterized by having a blade pivoted on said frame beyond the outer end of said die cell so as to extend transversely over the outer end of said die cell for engagement with the extruded crop material extending from the outer end of said die cell, and means biasing said blade inwardly toward the outer end of said die cell as the blade is forced outwardly by the extruded material, whereby said blade exerts a positive wafer ejecting force on the extruded material so as to periodically eject the compacted, extruded crop material transversely from the end of said die cell as discrete wafers.

2. An ejector device for wafering machines having at least one die cell from which compacted crop material is extruded in an axially outward direction adjacent a frame, characterized by having a plate shiftably secured to said frame, and a blade pivoted on said frame beyond the outer end of said die cell so as to extend transversely over the outer end of said die cell for engagement with the extruded crop material extending from the outer end of said die cell, and biasing means spring tensioned between said blade and said plate for biasing said blade inwardly toward the outer end of said die cell as the blade is forced outwardly by the extruded material, whereby said blade exerts a positive wafer ejecting force on the extruded material so as to periodically eject the compacted, extruded crop material transversely from the end of said die cell as discrete wafers.

References Cited by the Examiner

UNITED STATES PATENTS

| | | | |
|---|---|---|---|
| 1,010,175 | 11/11 | Pooley | 107—14.5 |
| 1,881,171 | 10/32 | Cooley | 107—14.5 |
| 3,062,129 | 11/62 | Wandel | 100—147 X |

FOREIGN PATENTS

| | | |
|---|---|---|
| 510,901 | 3/55 | Canada. |
| 995,966 | 8/51 | France. |
| 1,250,174 | 11/60 | France. |
| 21,553 | 5/83 | Germany. |

WALTER A. SCHEEL, *Primary Examiner.*